United States Patent [19]

Yializis et al.

[11] Patent Number: 5,716,532

[45] Date of Patent: Feb. 10, 1998

[54] DEMETALLIZATION OF POLYMER/METAL MULTILAYER FILMS BY ETCHING

[75] Inventors: Angelo Yializis, Tucson, Ariz.; John G. Keimel, New Brighton, Minn.; Alvin S. Rhorer, Chandler; Trey W. Huntoon, Tucson, both of Ariz.

[73] Assignee: Sigma Labs, Inc., Tucson, Ariz.

[21] Appl. No.: 661,387

[22] Filed: Jun. 11, 1996

[51] Int. Cl.⁶ .................... H01G 4/228; B21F 41/00
[52] U.S. Cl. ................... 216/6; 216/100; 216/102; 216/103; 216/104; 216/108; 216/109; 361/306.1; 29/25.03
[58] Field of Search .................. 216/6, 100, 102, 216/103, 104, 108, 109; 361/306.1

[56] References Cited

U.S. PATENT DOCUMENTS

| | | | |
|---|---|---|---|
| 2,673,792 | 3/1954 | Gulton | 216/6 |
| 4,490,774 | 12/1984 | Olson et al. | 361/311 |
| 4,499,520 | 2/1985 | Cichanowski | 361/311 |
| 4,513,349 | 4/1985 | Olson et al. | 361/311 |
| 4,515,931 | 5/1985 | Olson et al. | 526/323 |
| 4,533,710 | 8/1985 | Olson et al. | 526/323 |
| 4,613,518 | 9/1986 | Ham et al. | 427/38 |
| 4,685,197 | 8/1987 | Tigelaar et al. | 216/6 |
| 5,018,048 | 5/1991 | Shaw et al. | 361/323 |
| 5,097,800 | 3/1992 | Shaw et al. | 551/645 |

FOREIGN PATENT DOCUMENTS 574985  4/1959  Canada.

Primary Examiner—Kathryn L. Gorgos
Assistant Examiner—Edna Wong
Attorney, Agent, or Firm—Benman & Collins

[57] ABSTRACT

A method of improving the breakdown strength of polymer multi-layer (PML) capacitors is provided. The method comprises removing metal, specifically, aluminum, from the cut edge. This is done by either etching back the metal electrode layers in either basic or acidic solution or by anodizing the metal to cover that portion of the metal at the edge with an oxide. Removing the metal from the cut edge increases the breakdown strength of the PML capacitors by a factor of two or more.

12 Claims, 3 Drawing Sheets

DEMETALLIZATION OF POLYMER/METAL MULTILAYER FILMS BY ETCHING

TECHNICAL FIELD

The present invention relates generally to monolithic thin film capacitors, and, more particularly, to a method for increasing the break-down voltage and decreasing the leakage current.

BACKGROUND ART

A monolithic capacitor is one in which the layers of electrodes and dielectric are bonded together in a unitary structure as opposed, for example, to a metallized film capacitor in which self-supporting films are rolled or wound into the capacitor form. A miniaturized capacitor is one of very small dimensions, so as to be suitable for microcircuitry.

Small overall size could denote low capacitance of little practical value, except that the thickness of the intervening dielectric layer inversely affects the capacitance between adjacent electrodes, and the number of electrode pairs directly affects capacitance. Therefore, as a matter of basic capacitor theory, a capacitor having very thin dielectric layers and many pairs of electrodes could have substantial capacitance despite being of miniature size, with the active area of the electrodes being quite small.

Such a miniaturized capacitor is disclosed and claimed in U.S. Pat. Nos. 5,018,048, and 5,097,800. While that capacitor is fine for its intended purpose, it tends to have a low breakdown strength, on the order of 150 Volts (V), compared to a theoretically possible higher breakdown strength on the order of 500 to 1000 V, depending on the configuration. The cause of the lower breakdown voltage appears to reside in exposed edges that arc over with increasing applied voltage.

Thus, a method of increasing the breakdown strength of miniaturized monolithic multi-layer capacitors is required.

DISCLOSURE OF INVENTION

In accordance with the invention, a method of improving the breakdown strength of polymer multi-layer (PML) capacitors is provided. The method comprises removing, or oxidizing, those portions of the metal electrodes, specifically, aluminum, that are adjacent to the cut edge. This is done by either etching or by anodizing metal electrode layers in either basic or acidic solutions. The aluminum reactions are:

and

It is believed that these reactions occur simultaneously at the electrode surface, and that the pH of the electrolyte bath offers a means of regulating which process occurs preferentially.

Removing or oxidizing the conductive metal from the cut edge increases the breakdown strength of the PML capacitors by decreasing exposed edge breakdowns.

BEST MODES FOR CARRYING OUT THE INVENTION

Figure 1:
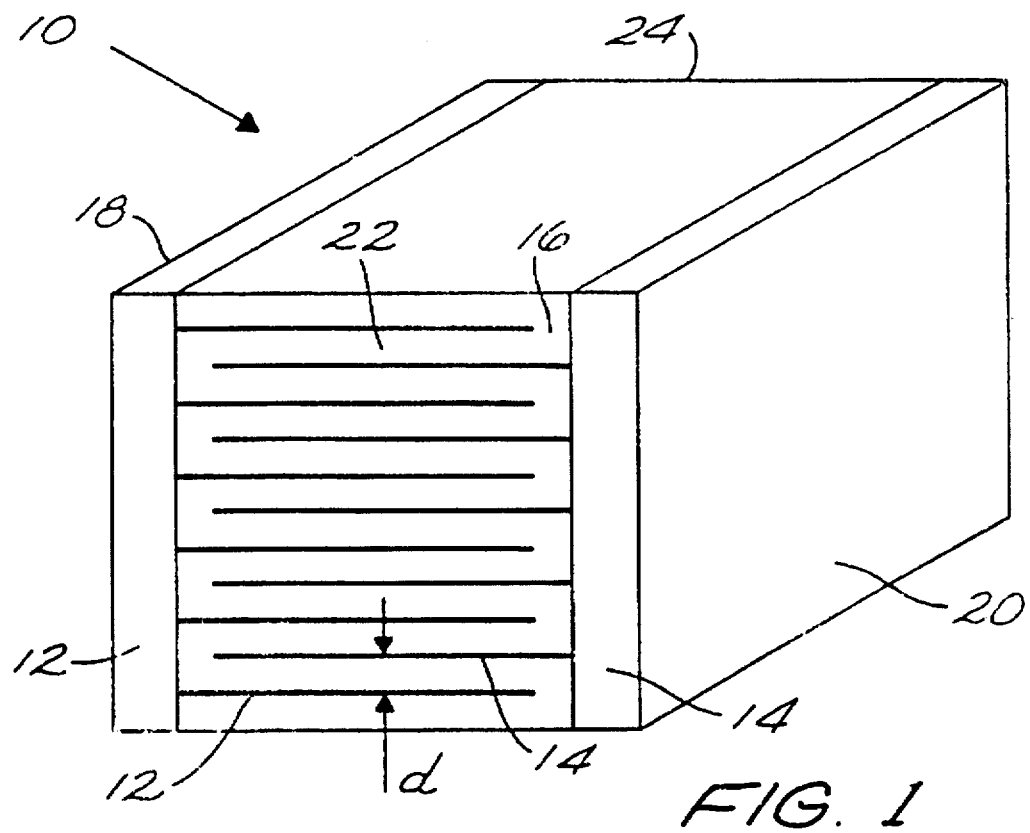
FIG. 1 is an enlarged view in perspective of one form of a capacitor benefited by the method of the present invention.

Referring now to the drawings, FIG. 1 shows a capacitor 10 comprising two sets of interleaved electrodes 12, 14, separated by a dielectric 16. Each set of electrodes 12, 14 terminates in a common solder termination strip 18, 20, respectively, for connection into an electrical circuit (not shown).

The electrodes 12, 14 are separated by a distance d, typically about 1 μm, although the distance may be smaller or larger, depending on the particular design of the capacitor 10. The electrodes 12, 14 may comprise any of the metals commonly employed in capacitor design; however, since aluminum is generally used, it is preferred. The aluminum electrodes are about 50 to 500 Ångstrom (Å) thick.

The capacitor termination strips 18, 20 comprise a metal which is readily solderable, such as that described in U.S. Pat. No. 4,613,518.

The polymer dielectric comprises a cured polymer, i.e., radiation-curable, capable of adhering or bonding to the electrode material. Useful resins are polyfunctional acrylics, and mixtures thereof, such as disclosed in U.S. Pat. Nos. 4,499,520; 4,490,774; 4,533,710; 4,513,349; and 4,515,931. The specific dielectric materials are thus well-known and do not form a part of the present invention.

As will be apparent from the dimensions given, even a miniature capacitor of this design which is less than 1 inch square in the outer periphery and a few millimeters thick can embody many alternate electrode 12, 14 and dielectric layers 16, up to 1,000 or more. The result is a capacitor that is effective at up to 50 Volts with a capacitance in the 0.001 to 100 or more microfarad range, depending, of course, upon overall size and the number of electrode pairs.

The dielectric coatings 16 space and separate the conductive layers 12, 14 which, as described above, are uniformly interleaved in stacked electrically isolated relation. The fabrication of the thin film capacitor 10 is described elsewhere; see, e.g., U.S. Pat. Nos. 5,018,048 and 5,097,800. Briefly, capacitors like the capacitor 10 are simultaneously formed in large numbers by depositing electrode material 12, 14 and dielectric 16 on a rotating drum (not shown), which rapidly moves relative to the depositing systems.

Figure 2:
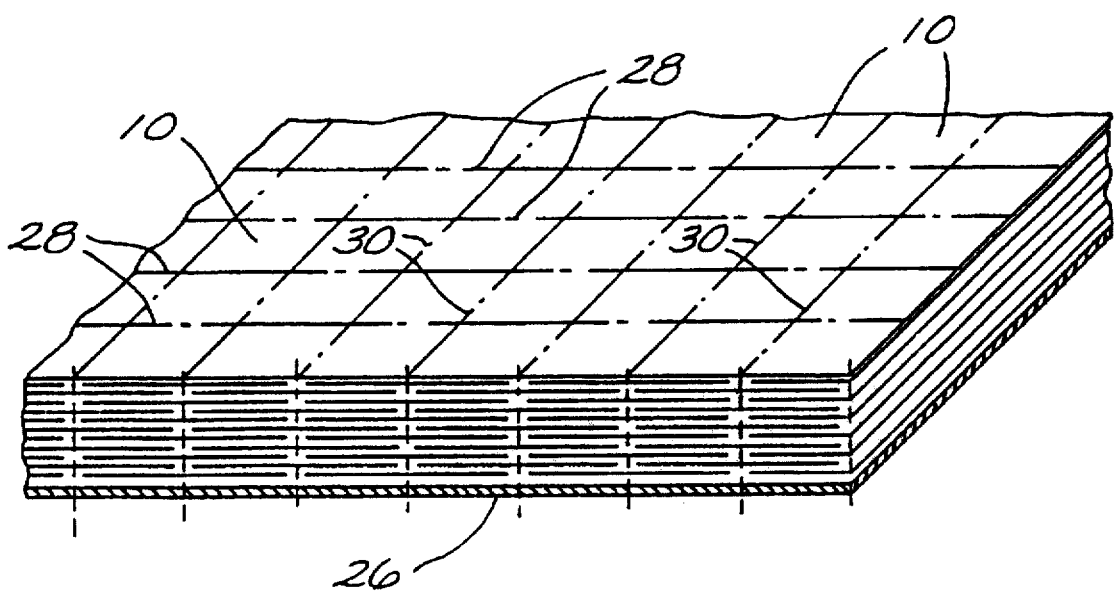
FIG. 2 is a perspective view showing a plurality of capacitors of FIG. 1 in the form in which they are manufactured.

The conductive layers 12, 14 and dielectric coatings 16 are built up in the number desired by causing successive passes to be made relative to the depositing systems. The resulting structure, shown in FIG. 2, is then sliced along lines 28 to form individual straps, which are then in turn sliced along lines 30 to form the individual capacitors 10.

Termination strips 18, 20 are then added along the faces formed by cutting along lines 30. Leads (not shown) are added to the solder termination strips 18, 20, and the device 10 is encapsulated.

During the former slicing operation (along lines 28), exposed edges 22, 24 are formed. Both the conductive layers 12, 14 and dielectric coating 16 are exposed. The limited breakdown voltage is believed to be caused by the exposed edges of the conductive layers. Specifically, breakdown arcs occur more readily (at lower fields) along surfaces and interfaces. Breakdown through bulk (solid) material is more difficult than breakdown along a solid/gas interface.

The largest degree of difficulty encountered when chemically or electrochemically treating multilayer capacitors 10 is physical damage to the device. This delamination occurs, to some extent, during chemical treatment; however, electrochemically, the capacitors 10 have a higher tendency to delaminate. This is believed to be due to the reactions being electrochemically accelerated. The delamination is caused by the electrolyte traveling between the polymer layers 16, and causes the capacitor 10 to fan outward as the electrolyte, driven by the existence of unoxidized aluminum 12, 14 and capillary forces travels up the termination 18, 20 and enters the bulk of the capacitor. Eventually delamination will destroy the capacitor if suitable precautions are not taken.

In accordance with the present invention, the individual capacitors 10 are treated by dipping in a suitable liquid etchant and removing, or oxidizing, the exposed portions of the conductive layers 12, 14. The goal of the etchant is to remove aluminum electrode material 12, 14 to recess the edge of the electrode into the dielectric layers 16 or to convert the exposed aluminum to a nonconductive oxide. In particular, the exposed aluminum edges are dissolved until the aluminum edge is recessed about 100 μm in the dielectric 16. The further the metal is etched away, the more difficult it is to break down, and the better the performance will be. However, mechanical deterioration limits occur when etching is extensive, decreasing the active area of the electrodes.

Alternatively, oxidation may be performed by use of a suitable liquid electrolyte and anodization of the exposed portions of the conductive layers 12, 14. Conceptually, the growth of aluminum oxide on the exposed edges of the aluminum electrodes 12, 14 would also reduce detrimental edge effects by protecting the exposed edge. The oxide layer that forms should diminish considerably the surface current and should consequently increase the breakdown voltage.

In either case (etching or anodization), the treatment is performed after separating the capacitors 10 into individual units and before encapsulation.

Examples of suitable liquid electrolytes include conventional bases and acids. Examples of suitable basic etchants include the hydroxides of potassium and sodium (KOH and NaOH, respectively), while examples of suitable acidic oxidizers include hydrofluoric acid (HF), sulfuric acid ($H_2SO_4$), and phosphoric acid ($H_3PO_5$).

EXAMPLES

A. Preliminary Experiments.

1. Example 1.

For the capacitors tested, an agitation soak in 0.1M KOH for 20 hours was optimal. The etching time depends on the molarity of the solution. Concentrations of 1.0M may etch the aluminum electrodes 12, 14 into the dielectric 16 by about 100 μm in a few hours.

In the etchant embodiment, the capacitors 10 were dipped into the liquid etchant for a predetermined etching time, as determined above. The dip was conveniently performed at room temperature, but elevated temperatures, below the boiling point of the liquid, may also be used.

With regard to anodization, any of the conventional acidic anodization solutions may be used in the practice of the present invention. An example of an acidic anodization solution comprises 1.000 g deionized $H_2O$, 100 g boric acid, and 0.15 g ammonium tetraborate tetrahydrate. The anodization process, when carried out at 70° C., is more efficient and yields shorter anodization times.

The anodization can be run in either of two modes. The first mode (unipolar) consists in grounding the solution and biasing both chip leads positively, whereas in the other mode (bipolar), the solution is left floating and the power supply is connected across the capacitor chip.

B. General Considerations.

Polymer multi-layer (PML) chips measuring approximately 3 mm×5 mm were dipped in or anodized in various liquids (basic and acidic). These polymer capacitors were manufactured with a hexane diol diacrylate (HDODA) monomer. Pertinent physical characteristics of the capacitors are shown in Table I.

TABLE I

Capacitor Physical Characteristics.

| Capacitor | Dimensions | Number of Layers | Layer Thickness |
| --- | --- | --- | --- |
| 220 nF | 3 mm × 5 mm | 1020 | 1.395 μm |
| 680 nF | 3 mm × 5 mm | 1809 | 0.775 μm |

Example 2. Removal by Etching.

The basic (high pH) etchants (KOH) employed herein performed well with controlled aluminum removal rates. The removal of material from the exposed edges doubled the breakdown strength of the capacitors and reduced the leakage current. Specifically, a factor of 2 in improvement in breakdown strength, up to 400 V/μm, was observed, with numerous measurements over 100 V/μm.

The acidic etchants (HF and $H_2SO_4$) employed herein attacked the polymer dielectric 16 at a higher rate than the basic etchants and removed aluminum at a lower rate, resulting in reduced overall performance.

Examples of different conditions in basic and acidic solution are shown in Table II, below.

TABLE II

Liquid Etchants Tested and General Results.

| ETCHANT | RESULTS |
| --- | --- |
| $H_2SO_4$ | Minimal etching, test results similar to unetched samples. |
| HF | Destroyed the capacitors layer-by-layer rather than working in from the edges. Apparently, the acid was able to find weak spots in a polymer layer, seep through, and dissolve the entire aluminum layer from the center where it was unprotected by an oxide layer. |
| 95% Phosphoric acid and 5% Nitric acid etchant | Slight delamination apparent, but no visible etching. |
| KOH | Removed metallic aluminum from the edge of each layer at a controllable rate. |

A rapid ramp test was performed in which the voltage was ramped at 50 V/sec until a voltage, $V_{max}$, where current sensors indicated a catastrophic failure was about to occur. $V_{max}$ was usually highest for the first repetition of the test, but occasionally increased as impurities bridges between capacitor poles were cleared. The results of the rapid ramp test, shown in Table III, indicate significant increases in $V_{max}$ in the etched samples, particularly for the 220 nF samples. The etching procedure was a 20 hour soak in stirred 0.1M KOH.

TABLE III

Results from Rapid Ramp Test.

| Capacitor Description | Maximum $V_{max}$ Observed | Average First $V_{max}$ Measured | Breakdown Field from Avg 1st $V_{max}$ |
|---|---|---|---|
| 220 nF unetched | 180 V | 160 V | 115 MV/m |
| 220 nF etched | 550 V | 480 V | 344 MV/m |
| 680 nF unetched | 200 V | 150 V | 194 MV/m |
| 680 nF etched | 400 V | 230 V | 297 MV/m |

Figure 3:
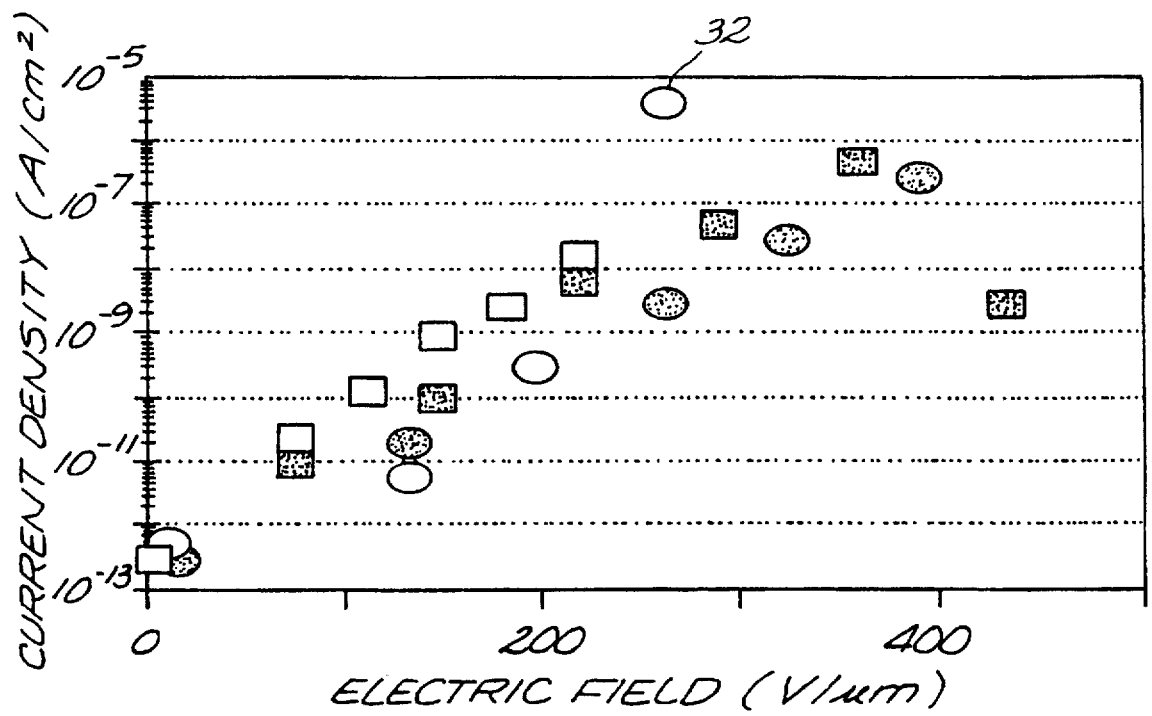
FIG. 3 on coordinates of current density J (in A/cm$^2$) and electric field E (in V/μm), is a plot showing the effect of etching in accordance with the present invention on the leakage current of capacitors.

Pulsed clearing tests were run to provide a leakage current measurement. The pulsed clearing leakage current measurements were performed by pulsing the applied voltage above the measuring voltage. A typical sequence would be to pulse at 100 V, measure at 10 V, pulse at 150 V, measure at 100 V, pulse at 200 V, measure at 150 V, pulse at 250 V, measure at 200 V, and so on, incrementing by pulse and measurement voltages by 50 V. The measurement included both capacitance and resistance, so leakage current and capacity degradation could be observed. The measurements were halted if the resistance dropped below 1M or if the capacitor failed and/or shorted. Verifying the results of the rapid ramp test, the data plotted in FIG. 3 indicate that etched capacitors break down at a higher voltage than unetched capacitors. The squares represent the 220 nF capacitors, while the ellipses represent the 680 nF capacitors. The filled squares and ellipses represent etched capacitors, while the untilled squares and ellipses represent unetched capacitors. The resistance was observed to drop as the voltage increased, indicating the non-linear behavior (the log scale on the ordinate axis will be noted) expected from and insulating material.

Example 3. Initial Anodization Treatment.

A conventional acidic anodization solution was used in the anodization process of the present invention. The anodization solution comprised 1,000 g deionized $H_2O$, 100 g boric acid, and 0.15 g ammonium tetraborate tetrahydrate. A high voltage-low current power supply was used to drive a low current. A chart recorder and a Triple T analog multimeter were used to record the voltage and current, respectively.

The experiment was run in one of two modes. The first mode (unipolar) consisted in grounding the solution and biasing both chip leads positively, whereas in the other mode (bipolar), the solution was left floating and the power supply was connected across the electrodes of the capacitor chip. Two 0.08 inch thick epoxy-covered Al strips, &dimensions 0.125 inch×7.4 inch, were used as electrodes.

I. Basic Pretreatment Prior to Anodization.

Samples were pretreated with a basic etching solution prior to the anodization process. The pretreatment is indicated by the sample number (10, 12, 15). Subsequently, the samples were anodized in the acidic solution as indicated by the following: "A" indicates bipolar, "B" indicates unipolar. The results are shown in Table IV.

TABLE IV

Summary of the Different Cases in the Basic Pretreatment Solution

| Sample | Capacitor Electrodes Bias | Solution Container Wall Bias | Reaction Time | Voltage | Basic Solution |
|---|---|---|---|---|---|
| 10A & 10B | + | Ground | 5 min | 50 V | 1M KOH |
| 12A & 12B | no | no | 5 min | — | 1M KOH |
| 15 | no | no | 22 hours | — | 0.1M KOH |
| 10A & 10B | + | Ground | 5 min | 50 V | 1M KOH |
| 12A & 12B | no | no | 5 min | — | 1M KOH |
| 15 | no | no | 22 hours | — | 0.1M KOH |

As shown in Table IV, sample 10 was biased in the basic solution to investigate any electro chemical inhancements of etching rates. Sample 12 was an accelerated version of the etching procedure of sample 15. Sample 15 is similar to the etching described in the previous section and is used as a baseline.

Samples 10B and 12B showed leakage current as low or lower than the baseline sample 15. However, this test was inconclusive, since the capacitors delaminated before the anodization was complete (anodization voltages should terminate at approximately 800 V, the maximum possible being 100 V before delamination occurred).

II. Anodization without Pretreatment.

Examples of different anodizing conditions in the acidic anodization solution are shown in Table V, below.

TABLE V

Summary of the Different Cases in the Acidic Anodization Solution.

| Sample | Capacitor Electrode Bias | Solution Container Wall Bias | Reaction Time | Maximum Voltage, V |
|---|---|---|---|---|
| 10A | +/− | no | 15 sec. | 98 |
| 10B | + | ground | 15 sec. | 101 |
| 12A | +/− | no | 15 sec. | 90 |
| 12B | + | ground | 15 sec. | 95 |

Note: the sign +/− signifies that the voltage is applied across the two sets of electrodes in a capacitor chip.

Figure 4:
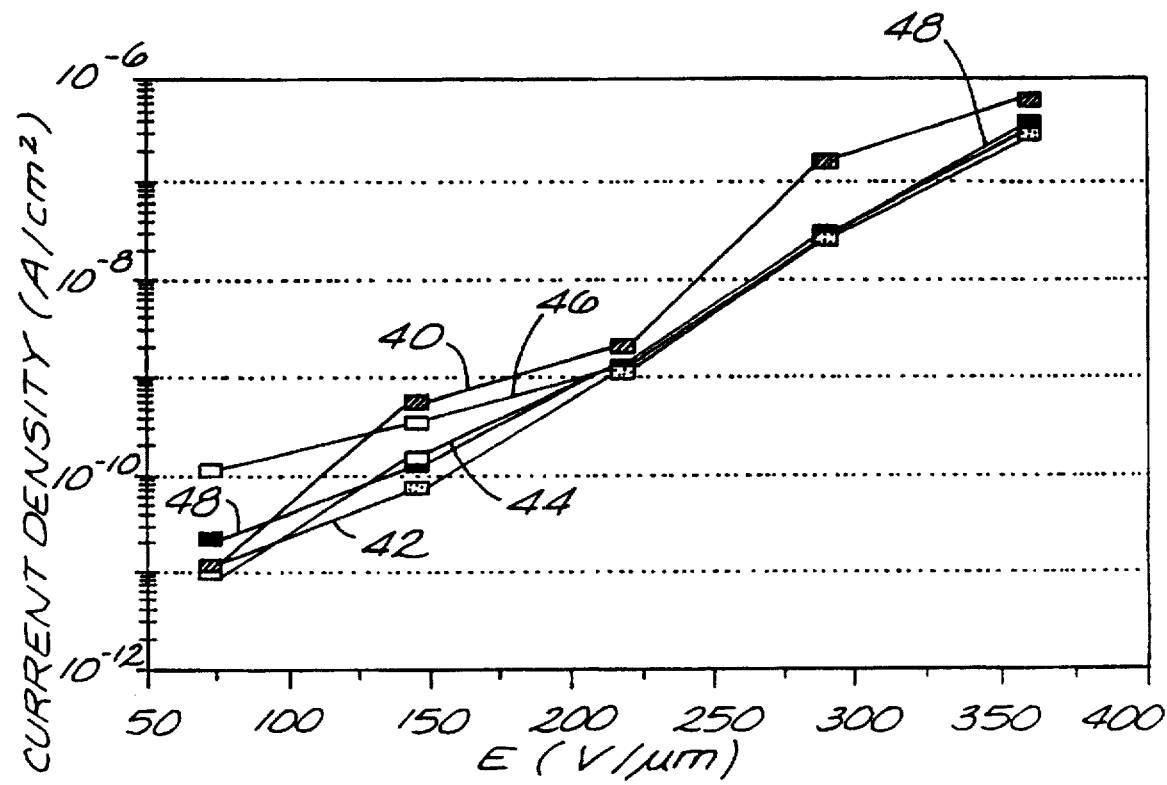
FIG. 4 on coordinates of current density J (in A/cm$^2$) and electric field E (in V/μm), is a plot showing the effect of anodization in accordance with the present invention on the leakage current of capacitors.

FIG. 4 is a plot depicting the current density as a function of applied electric field for the different cases in the study. Sample 10A is represented by Curve 40, Sample 10B by Curve 42, Sample 12A by Curve 44, Sample 12B by Curve 46, and Sample 15 by Curve 48. From the plot, it is shown that the anodization process can make a difference at low voltages in which the unipolar biasing method both in the acid and the base gives the most effective results.

Example 4: Additional Anodization Treatment.

The anodization process is driven by several hundred volts/cm. This voltage is used to cause water to disassociate into oxygen and hydrogen at the surface of the aluminum 12, 14 where oxygen is consumed in reaction [1].

The rate at which surface reactions occur is critical to the survival of the capacitor. Without restriction, electrochemical treatment will occur at several hundred milliamps/cm, and at this rate the capacitor will be completely delaminated within a few minutes. For the data presented below, the current was limited to 10 milliamps. This number has been shown to slow down the reaction significantly, which keeps delamination to a minimum, and still results in reasonable improvement in the specifications of capacitor 10.

Another parameter of consideration to hinder delamination is limiting the total amount of time and area of edge 22, 24 the sample 10 is exposed to the electrolyte. The method which yields the most success is suspending the capacitor 10 over the electrolyte bath, dipping the pretreated edge into the electrolyte, and then pulling the device from the electrolyte until just the meniscus keeps the liquid in contact with the edge, 22, 24. This removes most of the capillary forces which cause the capacitor 10 to delaminate. In addition, the bulk, excluding the edge, of the capacitor 10 must be kept under compression to further stifle the delamination process. Lastly, the capacitor 10 must not be allowed to be in contact with the electrolyte for longer than a few minutes. An edge 22, 24 in electrochemical contact with the electrolyte for longer than 10 minutes, even at reduced current densities, will show significant damage and results in the breakdown voltage decreasing. Presumably, this is due to the delamination of the capacitor 10 along the layers of dielectric 16. It is therefore necessary to find experimental parameters where the most charge is passed in the least amount of time while not causing damage to the mechanical integrity of the capacitor 10.

Example 5:

The capacitors 10 were placed in appropriate framework which exposed the capacitor's edges 22, 24 while maintaining the rest of the capacitor in compression. Electrical contact was made with the terminations 18, 20 of the capacitor through the framework. The capacitor was lowered into the electrolyte and pulled back out until only the meniscus of the electrolyte is in contact with the edge of the capacitor.

The potential source was limited to 300 or 600 volts and 10 milliamps. The positive lead was connected to the terminations 18, 20 of the capacitor 10, while the negative lead is held at ground. A current sink, which limited the current through the capacitor, was placed in series with the bath. Power was supplied across the capacitor for 3 to 10 minutes. After this treatment, the capacitors were removed from the electrolyte and the process was repeated again on the opposing edge.

Both electrodes of capacitors 10 from Lane 10 of straps designated as 1307 and 1309 (an example of straps is shown in FIG. 2), were electrochemically treated simultaneously in the previously described unipolar mode. A strong base and acid (KOH and $H_2SO_4$) were used as the electrolytes. The duration of the treatment as well the maximum voltage allowed were varied as binary parameters. Batches of approximately seven capacitors were prepared according to the conditions in Table VI. The capacitors from each batch were mounted together in a bracket and dipped into the electrolyte at the same time. Each capacitor in the batch was electrically connected in parallel and anodized or etched simultaneously. After the treatments, the capacitors were washed in an ultrasonically activated bath of isopropanol and returned to the usual vacuum storage containers. Batch 10 was the control with no edge treatment at all. Batch 9 was treated first at pH 13.5 for a duration of 10 minutes to a maximum voltage of 300 V, then treated immediately in a pH 1 solution using the same voltage and duration.

The samples were tested to determine the initial capacitance, the maximum energy density before breakdown, the normalized leakage current at 1.0 J/cm³, and the normalized leakage current at the maximum energy density.

Qualitatively, the edge treatment shifted the mechanism of failure from the exposed edge 22, 24 to the solder terminations 18, 20. If visible discharges indicate the primary failure mechanism, then the edge treatments shifts the failure mechanism from the exposed edge to the solder terminations.

TABLE VI

Process parameters for electrochemical edge treatment experiment.

| Batch | Duration | pH | voltage setting | Strap # |
|---|---|---|---|---|
| 1 | 3 | 1 | 300 | 1307 |
| 2 | 10 | 1 | 300 | 1309 |
| 3 | 3 | 13.5 | 300 | 1309 |
| 4 | 10 | 13.5 | 300 | 1307 |
| 5 | 10 | 1 | 600 | 1309 |
| 6 | 3 | 1 | 600 | 1307 |
| 7 | 3 | 13.5 | 600 | 1307 |
| 8 | 10 | 13.5 | 600 | 1309 |
| 9 | 10 | 13.5 then 1 | 300 | 1307 and 1309 |
| 10 | control - no edge treatment | | | 1307 and 1309 |

The results of the electrochemical etching and anodization experiment are presented in terms of the initial capacitance, energy density, and the normalized leakage current at an energy density of 1 J/cm³. The capacitor batches of the experiment were made up solely from straps 1307 or 1309. In order to compare the results from both batches, the results in this document are normalized by the average of the control capacitors (batch 10) from the same lane. That is, batches made up from 1307 (1309) capacitors are normalized by the average results result from the Batch 10 capacitors from lane 1307 (1309) only. For all results, a reported value of 1 means that the batch performed the same as the control Batch 10. For FIGS. 5 and 6, the solid circle is the minimum, the open circle is the mean, and the line represents the standard deviation. Batch 9_7 and 9_9 refer to Batch 9, strap 1307 and Batch 9, strap 1309, respectively.

Figure 5:
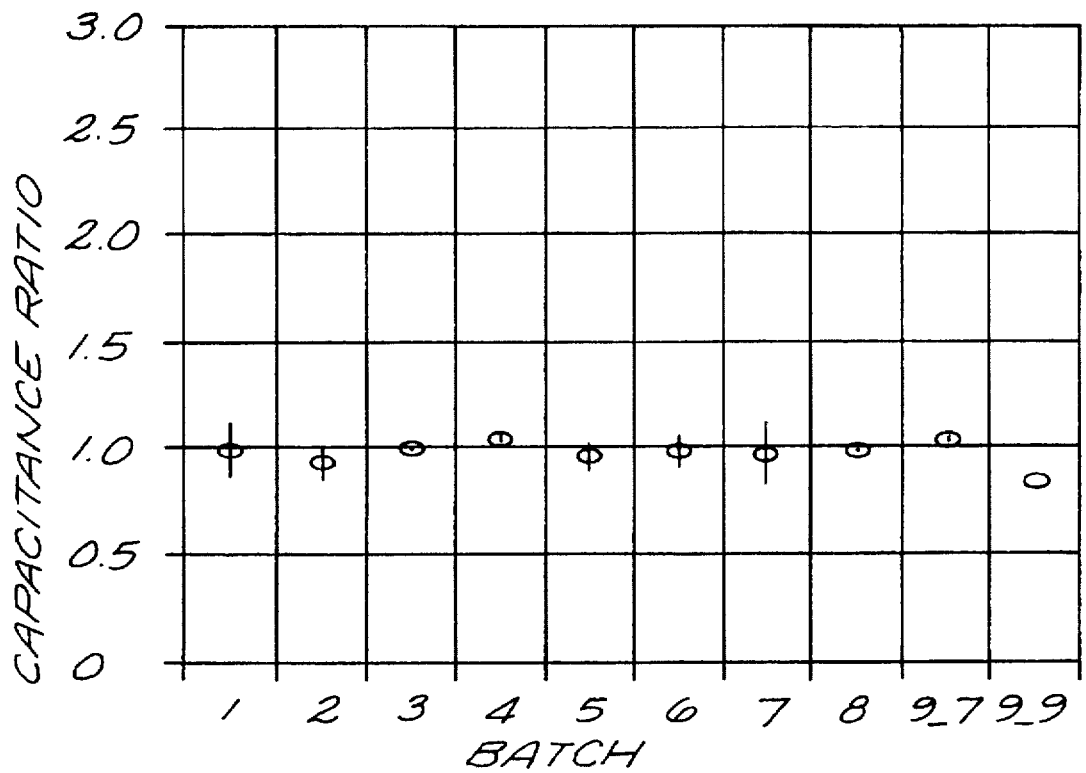
FIG. 5 on coordinates of capacitance ratio and batch number, is a capacitance plot normalized to non-treated capacitors showing that the capacitor is not harmed during electrochemical treatment.
Figure 6:
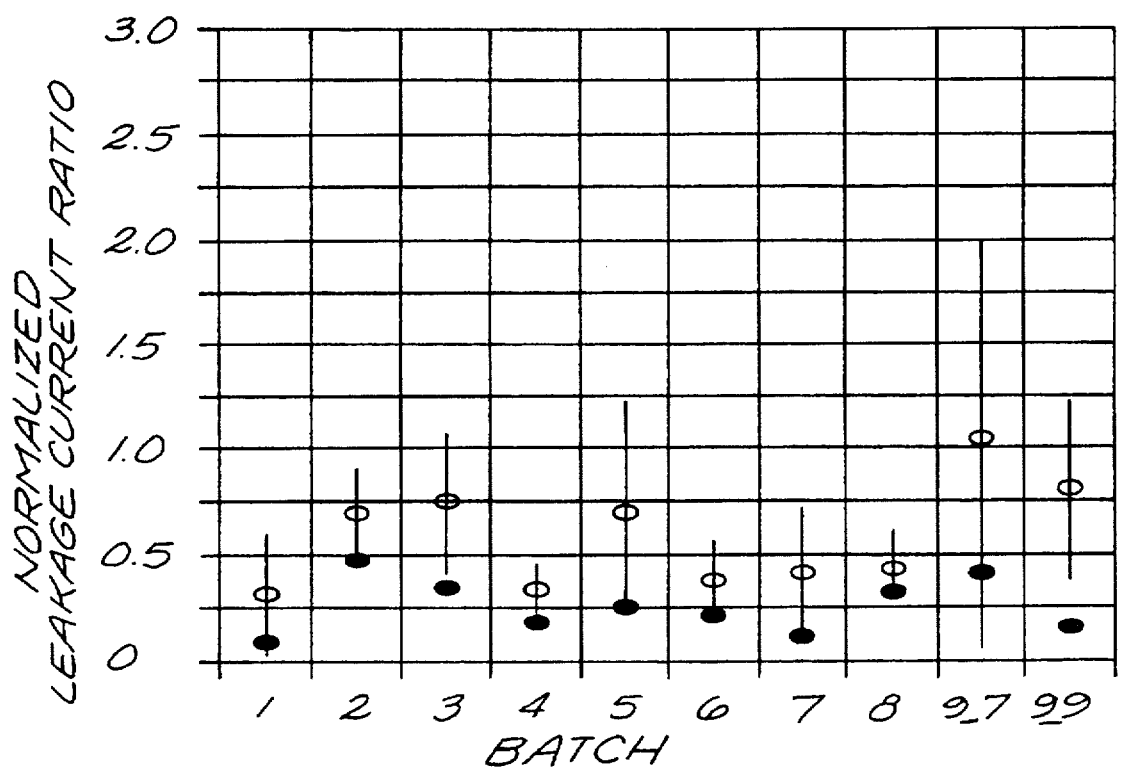
FIG. 6 on coordinates of normalized leakage current ratio and batch number, is a plot showing the current density of electrochemically-treated capacitors normalized to untreated capacitors.

The initial capacitance and the normalized leakage current at an energy density of 1 J/cm³ from lane 10 capacitors are shown in FIGS. 5 and 6, respectively. The capacitance shows a tight distribution around the control batch values. This shows that under the given set of parameters, there was no damage to the capacitors during the electrochemical processing. The breakdown voltage was only affected slightly, with a general but slight increase. The sequential etching followed by anodization of Batch 9 is slightly worse than the control Batch 10, as has been previously above.

The leakage current results for Batches 1 to 8, shown in FIG. 6, demonstrate an across-the-board improvement over the control Batch 10 (ignoring the Batch 9 double treatment). It is concluded from these results that the electrochemical treatment of the capacitors lowered the leakage current.

INDUSTRIAL APPLICABILITY

The method of the invention is expected to find use in fabricating polymer multi-layer capacitors having improved breakdown strength and lowering leakage current.

Thus, there has been disclosed a method for fabricating polymer multi-layer capacitors having improved breakdown strength. It will be readily appreciated by those skilled in this art that various changes and modifications of an obvious nature may be made, and all such changes and modifications are considered to fall within the scope of the invention.

What is claimed is:

1. A method of improving the breakdown strength of polymer multi-layer capacitors comprising a plurality of interleaved metal electrodes forming two plates of each of said capacitors, said metal electrodes separated by a dielectric coating, said method comprising:

(a) terminating a first set of metal electrodes on a first face of each of said capacitors;

(b) terminating a second set of electrodes on a second face of each of said capacitors, wherein said first and second faces are formed on opposite sides of each of said capacitors;

(c) initially forming said capacitors as a stack;

(d) slicing said stack into straps along a first direction;

(e) slicing said straps into individual said capacitors along a second direction which is orthogonal to said first direction to form said first and second faces;

(f) applying termination strips along said first and second faces of said capacitors, to leave exposed metal electrode edges from said slicing along said first direction; and (g) removing metal from said exposed metal electrode edges.

2. The method of claim 1 wherein said dielectric coating comprises a cross-linked, radiation-curable acrylic monomer.

3. The method of claim 2 wherein said metal comprises aluminum.

4. The method of claim 3 wherein said aluminum has a thickness within a range of about 50 to 500 Å.

5. The method of claim 3 wherein said aluminum is etched back into said first and second faces about 100 μm.

6. The method of claim 3 wherein said removal of aluminum is accomplished by etching said aluminum back from said edge.

7. The method of claim 6 wherein said etching is performed in a liquid etchant having a basic pH.

8. The method of claim 7 wherein said liquid etchant is selected from the group consisting of KOH and NaOH.

9. The method of claim 7 wherein said etching is performed for a period of time within the range of about 1 minute to 24 hours.

10. The method of claim 6 wherein said etching is performed in a liquid etchant having an acidic pH.

11. The method of claim 10 wherein said liquid etchant is selected from the group consisting of HF, $H_3SO_4$, and phosphoric acid and combinations thereof.

12. The method of claim 10 wherein said etching is performed for a period of time within the range of about 1 minute to 24 hours.

* * * * *

UNITED STATES PATENT AND TRADEMARK OFFICE
CERTIFICATE OF CORRECTION

PATENT NO. : 5,716,532
DATED : February 10, 1998
INVENTOR(S) : Angelo Yializis

It is certified that error appears in the above-indentified patent and that said Letters Patent is hereby corrected as shown below:

At column 8, line 63, before "forming" insert --comprising aluminum--.

At column 8, line 65, after "coating" insert --comprising a cross-linked, radiation-curable acrylic monomer, with a first set of metal electrodes terminating on a first face of each of said capacitors and a second set of electrodes terminating on a second face of each of said capacitors, wherein said first and second faces are on opposite sides of each of said capacitors, wherein--;

At column 8, line 65, delete "comprising" and insert --comprises--;

At column 8, line 66, delete "terminating a first set of metal electrodes on a first face of each of said capacitors" and insert --depositing said metal electrodes of aluminum and said dielectric coating of said cross-linked, radiation curable acrylic monomer on a rotating drum to build up alternating layers of said metal electrodes and said dielectric coating to form a capacitor stack--;

At column 9, line 1, delete "terminating a second set of electrodes on a second face of each of said capacitors, wherein said first and second faces are formed on opposite sides of each of said capacitors;" and insert --slicing said capacitor stack into straps along a first direction;--;

At column 9, line 5, delete "initially forming said capacitors as a stack;", and insert --slicing said straps into individual capacitors along a second direction which is orthogonal to said first direction to form said first and second faces;--;

At column 9, lines 6-9, delete entire lines.

At column 9, line 10, delete "(f)", and insert --(d)--;

At column 9, line 11, after "capacitors", delete "," and after "exposed", insert --aluminum--;

UNITED STATES PATENT AND TRADEMARK OFFICE
CERTIFICATE OF CORRECTION

PATENT NO. : 5,716,532

DATED : February 10, 1998

INVENTOR(S) : Angelo Yializis

Page 2 of 3

It is certified that error appears in the above-indentified patent and that said Letters Patent is hereby corrected as shown below:

At column 9, line 15, delete "(g),", and insert --(e); before "metal" insert --aluminum-- (both occurrences);

At column 9, line 17, delete "2. The method of claim 1 wherein said dielectric coating comprises a cross-linked, radiation-curable acrylic monomer."'

At column 9, line 19, delete "3. The method of claim 2 wherein said metal comprises aluminum.";

At column 9, line 22, delete "4." and insert --2.--; delete "3" and insert --1--;

At column 10, line 1, delete "5." and insert --3.--; delete "3" and insert --1--;

At column 10, line 3, delete "6." and insert --4.--; delete "3" and insert --1--;

At column 10, line 6, delete "7." and insert --5.--; delete "6" and insert --4--;

At column 10, line 8, delete "8." and insert --6.--; delete "7" and insert --5--;

At column 10, line 10, delete "9." and insert --7.--; delete "7" and insert --5--;

At column 10, line 13, delete "10." and insert --8.--; delete "6" and insert --4--;

UNITED STATES PATENT AND TRADEMARK OFFICE
CERTIFICATE OF CORRECTION

PATENT NO. : 5,716,532
DATED : February 10, 1998
INVENTOR(S) : Angelo Yializis

It is certified that error appears in the above-indentified patent and that said Letters Patent is hereby corrected as shown below:

At column 10, line 15, delete "11." and insert --9.--; delete "10" and insert --8--;

At column 10, line 18, delete "12." and insert --10.--; and delete "10" and insert --8--.

Signed and Sealed this

Third Day of November, 1998

Attest:

Attesting Officer

BRUCE LEHMAN

Commissioner of Patents and Trademarks

UNITED STATES PATENT AND TRADEMARK OFFICE
CERTIFICATE OF CORRECTION

PATENT NO. : 5,716,532
DATED      : February 10, 1998
INVENTOR(S) : Angelo Yializis et al It is certified that error appears in the above-indentified patent and that said Letters Patent is hereby corrected as shown below:

At item [73], Assignee, after "Sigma Labs, Inc., Tucson, Ariz.", insert --and Medtronic, Inc., Minneapolis, Minnesota--.

Signed and Sealed this

Fourth Day of April, 2000

*Attest:*

Q. TODD DICKINSON

*Attesting Officer*     *Director of Patents and Trademarks*